United States Patent
Wagner et al.

(10) Patent No.: US 11,566,681 B2
(45) Date of Patent: Jan. 31, 2023

(54) COAXIAL SPRING DAMPER DEVICE AND SYSTEM

(71) Applicant: Raytheon Canada Limited, Ottawa (CA)

(72) Inventors: Kevin B. Wagner, Midland (CA); John M. Connolly, Penetanguishene (CA)

(73) Assignee: Raytheon Canada Limited

( * ) Notice: Subject to any disclaimer, the term of this patent is extended or adjusted under 35 U.S.C. 154(b) by 0 days.

(21) Appl. No.: 16/222,938

(22) Filed: Dec. 17, 2018

(65) Prior Publication Data

US 2020/0191232 A1    Jun. 18, 2020

(51) Int. Cl.
*F16F 13/00*    (2006.01)
*F16F 9/30*    (2006.01)
(Continued)

(52) U.S. Cl.
CPC ............ *F16F 13/005* (2013.01); *F16F 1/371* (2013.01); *F16F 1/373* (2013.01); *F16F 9/30* (2013.01);
(Continued)

(58) Field of Classification Search
CPC ........ F16F 13/005; F16F 15/022; F16F 3/093; F16F 3/10; F16F 3/12; F16F 15/085;
(Continued)

(56) References Cited

U.S. PATENT DOCUMENTS

| 119,823 | A | * | 10/1871 | Cochran | ................ | B60G 11/52 |
| | | | | | | 267/33 |
| 127,672 | A | * | 6/1872 | Anderson | .............. | B60G 11/52 |
| | | | | | | 267/33 |

(Continued)

FOREIGN PATENT DOCUMENTS

| CN | 102261413 | A | | 11/2011 |
| CN | 107605060 | A | * | 1/2018 |

(Continued)

OTHER PUBLICATIONS

Dialog translation, JP 61 286629 A. (Year: 1986).*

(Continued)

*Primary Examiner* — Thomas J Williams (57) ABSTRACT

A spring damper device comprising a directional spring (e.g., coil) having first and second ends, and defining an inner diameter region. A damper (e.g., viscoelastic polymer slug) comprising an element of elasticity configured to be situated within the inner diameter region of the directional spring. In response to a load on the spring damper device, the directional spring operates to compress, and the damper operates to dampen vibration associated with the load. The damper can comprise a viscoelastic damper comprising both an element of viscosity and the element of elasticity. The damper can be substantially coaxially aligned with the directional spring. Spring damper device(s) can be pre-loaded in a micro adjustment mechanism to account for positional adjustments between two structures (e.g., between a scope and a firearm), such that the spring(s) attenuate a shock impulse event (e.g., when firing), while the damper(s) attenuate vibration (e.g., to prevent damage the scope).

24 Claims, 7 Drawing Sheets

(51) Int. Cl.
*F16F 15/02* (2006.01)
*F16F 15/137* (2006.01)
*F16F 1/373* (2006.01)
*F41G 1/38* (2006.01)
*F16F 15/123* (2006.01)
*F16F 1/371* (2006.01)
*F16F 15/127* (2006.01)

(52) U.S. Cl.
CPC .......... *F16F 15/022* (2013.01); *F16F 15/127* (2013.01); *F16F 15/12353* (2013.01); *F16F 15/137* (2013.01); *F41G 1/38* (2013.01); *F16F 2224/02* (2013.01); *F16F 2226/04* (2013.01); *F16F 2234/02* (2013.01); *F16F 2236/04* (2013.01)

(58) Field of Classification Search
CPC .. F16F 15/127; F16F 15/137; F16F 15/12353; F16F 1/371; F16F 1/373; F16F 1/377; F41G 1/40; F41G 11/002; B60G 11/52; B60G 11/54
USPC .......................................................... 267/33
See application file for complete search history.

(56) References Cited

U.S. PATENT DOCUMENTS

| | | | | |
|---|---|---|---|---|
| 150,077 A * | 4/1874 | Pickels | .................. | B60G 11/52 267/33 |
| 199,945 A * | 2/1878 | Vose | ...................... | B60G 11/52 267/33 |
| 214,329 A * | 4/1879 | Vose | ...................... | B60G 11/52 267/33 |
| 330,445 A * | 11/1885 | Vose | ...................... | B60G 11/52 267/33 |
| 1,936,389 A * | 11/1933 | Hallquist | .................. | F16F 3/12 267/292 |
| 3,198,324 A * | 8/1965 | Kallenbach | ............... | F16F 3/10 206/320 |
| 3,428,279 A * | 2/1969 | Johnson | .................. | F16F 15/04 267/140.4 |
| 4,075,288 A * | 2/1978 | Graveron | .................. | C08L 9/00 525/308 |
| 4,168,819 A * | 9/1979 | Ducrocq | ............... | F16F 13/002 248/573 |
| 4,777,739 A * | 10/1988 | Hiles | .................... | A43B 7/1415 36/43 |
| 4,808,469 A * | 2/1989 | Hiles | ...................... | A42B 3/125 428/318.6 |
| 4,962,916 A | 10/1990 | Palinkas | | |
| 5,318,282 A * | 6/1994 | Schaefer | .................. | F16F 1/36 267/136 |
| 5,425,191 A | 6/1995 | Taylor et al. | | |
| 5,465,945 A * | 11/1995 | Matsushita | ............. | E04H 9/022 267/153 |
| 5,467,970 A | 11/1995 | Ratu et al. | | |
| 5,667,202 A * | 9/1997 | Gwinn | ...................... | F16F 3/10 267/140.2 |
| 7,270,320 B2 | 9/2007 | Menzel et al. | | |
| 7,329,258 B2 | 2/2008 | Studer | | |
| 8,636,271 B2 | 1/2014 | Check et al. | | |
| 8,833,511 B2 | 9/2014 | Maruyama et al. | | |
| 9,944,144 B2 | 4/2018 | Pepka | | |
| 2001/0044023 A1 * | 11/2001 | Johnson | .................... | F16F 1/37 428/354 |
| 2002/0063369 A1 | 5/2002 | Huang | | |
| 2002/0128074 A1 | 9/2002 | Jackel et al. | | |
| 2008/0012188 A1 | 1/2008 | Dickson | | |
| 2009/0079113 A1 | 3/2009 | Martin | | |
| 2009/0127043 A1 | 5/2009 | Dickson | | |
| 2013/0334750 A1 | 12/2013 | Fueki | | |
| 2014/0239567 A1 | 8/2014 | Suchta et al. | | |
| 2015/0284500 A1 * | 10/2015 | Zhao | .................. | C08G 18/4883 521/117 |
| 2016/0138672 A1 * | 5/2016 | Yao | ........................ | F16F 15/022 29/557 |
| 2017/0175848 A1 | 6/2017 | Timmons et al. | | |
| 2017/0356722 A1 * | 12/2017 | Jeung | .................... | F41G 11/003 |
| 2018/0149148 A1 * | 5/2018 | Resch | ................. | F04B 39/0044 |
| 2019/0338822 A1 * | 11/2019 | Germano | ................ | F16F 3/093 |
| 2020/0191232 A1 * | 6/2020 | Wagner | ...................... | F41G 1/38 |

FOREIGN PATENT DOCUMENTS

| | | | | |
|---|---|---|---|---|
| DE | 8705586 U1 | 5/1988 | | |
| EP | 1612449 A1 | 1/2006 | | |
| JP | 61286629 A * | 12/1986 | ............. | G03F 7/709 |
| JP | 63057933 A * | 3/1988 | ............... | F16F 3/10 |
| JP | 11193848 A * | 7/1999 | | |
| JP | 3543758 B2 * | 7/2004 | | |
| JP | 5993120 B2 * | 9/2016 | ............. | F16F 1/128 |

OTHER PUBLICATIONS

Dialog translation, JP 63 057933 A. (Year: 1988).*
International Search Report for International Application No. PCT/CA2019/051829 dated Mar. 24, 2020, 8 pages.
Extended European Search Report dated Dec. 7, 2021, in EP application No. 19898800.8 filed Dec. 17, 2019, 2 pages.

* cited by examiner

FIG. 11

COAXIAL SPRING DAMPER DEVICE AND SYSTEM

BACKGROUND

Spring mass damper systems, such as found in suspension systems of vehicles, are well known and widely used. Such systems typically have a mechanical spring element and a damping element, such as a mechanical coil spring operable with a fluid (gas) damper mechanism. In typical systems, as the coil spring reaches its maximum working range, the fluid damper mechanism operates (in conjunction with the coil spring) to dampen shock between two bodies or structures (e.g., vehicle frame and vehicle axles). However, the fluid damper device can as a secondary spring to the primary (coil) spring, thereby affecting or modifying the spring rate of the primary spring. Such "dual spring" configuration is not useful or ideal in other applications, such as applications involving a shock impulse event while still requiring some amount of damping effect from a damper element.

Other systems incorporate some type of a "crash pad" with a coil spring, such as a foam or rubber bushing or other component positioned proximate one end of the coil spring, so that when the coil spring reaches or exceeds its maximum working range limit (such as from an impulse shock event), the crash pad acts to stop or inhibit movement of the spring (to prevent it from "bottoming out"). Such foam or rubber "crash pads" absorb some amount of energy from the impulse shock event through deformation of the foam or rubber crash pad (e.g., converting mechanical energy to heat), but they do not help or operate to dampen resonant vibration between two structures or bodies between which the spring is situated.

In other prior systems having springs to attenuate shock, one or more directional springs (e.g., coil springs) can be positioned and "preloaded" between two structures or bodies, so that the springs are continuously biased between the bodies in a normal or default state or configuration. Yet, the springs operate to attenuate shock from an impulse shock event to avoid shock to one of the bodies. This configuration can be effective at removing backlash or play between the bodies when the position of one body is adjusted relative to the other body (e.g., such as when making micro adjustments in the position of an optics device, such as a scope, relative to the stock/body of the firearm to which the optics device is mounted). However, such systems suffer from creating an "underdamped" system, which is problematic with high shock systems like a projectile firing system because resonations or vibrations can transfer to the scope (optics device), for instance, which can affect performance and proper use of the optics device. Moreover, there is often very little room or space in such micro adjustment mechanisms to include a complex or cumbersome damping system that attenuates vibration from the firearm to the optics device.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, the present disclosure sets forth a spring damper device comprising a directional spring having first and second ends, and defining an inner diameter region, and a damper comprising an element of elasticity, and configured to be situated within the inner diameter region of the directional spring. In response to a load on the spring damper device, the directional spring operates to compress to absorb the load and any impact shock associated with the load, and the damper operates to dampen vibration associated with the load.

In one example, the damper comprises a viscoelastic damper comprising both an element of viscosity and the element of elasticity.

In one example, the damper is coaxially aligned with the directional spring.

In one example, the directional spring comprises a coil spring and the inner diameter region is defined by an inner diameter of the coil spring, and the damper is sized to be entirely situated within the inner diameter region of the coil spring.

In one example, the directional spring comprises a first height when uncompressed, and wherein the damper comprises a second height when uncompressed, wherein the first height is greater than the second height, such that the damper is contained with a working range of the directional spring.

In one example, the damper is substantially coaxially aligned with the directional spring.

The present disclosure sets forth a system for absorbing shock and damping vibration comprising a first structure having a spring seat, a second structure having a spring seat, such that the second structure is positioned opposite the first structure, and at least one spring damper device situated between the first and second structures, the at least one spring damper device comprising a directional spring having a first end positioned against the spring seat of the first structure, and a second end positioned against the spring seat of the second structure. The directional spring can define an inner region, such as an inner diameter region, depending upon the shape of the spring. A damper comprises an element of elasticity, and can be situated within the inner diameter region of the directional spring. In response to a load on the directional spring from the second structure, the directional spring operates to compress to absorb the load and an impact shock associated with the load, and the damper operates to dampen vibration associated with the load.

In one example, the damper comprises a viscoelastic damper comprising both an element of viscosity and the element of elasticity, and the directional spring and the viscoelastic damper can be at least partially compressed to comprise a pre-load between the first and second structures, such that the directional spring operates to absorb an impulse shock event while the viscoelastic damper operates to attenuate vibration.

In one example, the spring seat of the first structure comprises a bore sized and shaped corresponding to the directional spring, and the first end of the directional spring and at least part of the damper are received and situated within the bore, such that the directional spring and the bore cooperatively operate as structural support for the directional spring.

In one example, the system comprises a plurality of spring damper devices situated between the first and second structures, each of the plurality of spring damper devices comprising a directional spring and a viscoelastic damper situated within the directional spring, respectively, to define a plurality of spring damper devices. The plurality of spring damper devices can be at least partially compressed to comprise a pre-load between the first and second structures.

In one example, the first structure comprises a sight mount of a projectile firing mechanism, and wherein the second structure comprises a sight device mounted to the projectile firing mechanism via the sight mount. Thus, the plurality of directional springs are operable to account for positional adjustments of the sight device relative to the projectile firing mechanism, and the plurality of viscoelastic dampers are operable to attenuate vibration to the sight device in response to a firing event.

The present disclosure sets forth a method for making a spring damper device comprising providing a directional spring having first and second ends, and defining an inner diameter region, and forming a damper comprising an element of elasticity, and configured to be situated within the inner diameter region of the directional spring. In response to a load on the spring damper device, the directional spring operates to compress to absorb the load and an impact shock associated with the load, and the damper operates to dampen vibration associated with the load.

The present disclosure sets forth a method for assembling a spring damper system comprising providing a first structure having a plurality of spring seats, and a second structure having a plurality of spring seats (where the second structure is movable relative to the first structure). The method comprises situating a plurality of spring damper devices against respective spring seats of the first structure (each spring damper device comprising a directional spring and a damper situated within an inner diameter region of the directional spring). The method comprises preloading the plurality of spring damper devices and the system in which they operate by positioning the second structure adjacent the first structure, such that the plurality of spring damper devices are biased against respective spring seats of the second structure to be in a pre-loaded state. Thus, each directional spring operates to attenuate an impulse shock between the first and second structures, and each damper operates to dampen vibration between the first and second structures while in the pre-loaded state.

The method further comprises adjusting a position of the second structure relative to the first structure, such that at least one of the directional springs accounts for the adjusted position by exerting a biasing force associated with the preloaded force of the spring damper device.

To further describe the present technology, examples are now provided with reference to the figures. With reference to FIGS. 1A-20, and as an overview, in one example a spring damper device 100 can comprise a directional spring 102 (e.g., a coil spring) having a first end 104*a* and a second end 104b, and that can define an inner diameter region 106. The spring damper device 100 can comprise a damper 108 comprising an element of elasticity, and that can be configured to be situated within the inner diameter region 106 of the directional spring 102. In one example, the damper 108 can comprise a viscoelastic polymeric damper comprised of an element of elasticity and an element of viscosity. In response to a load on the spring damper device 100 (see e.g., FIGS. 2B and 2C), the directional spring 102 operates to compress to absorb the load and any associated impulse shock, and the damper 108 operates to dampen or attenuate vibration associated with the load and oscillations of the spring 102.

As further detailed below, the spring damper device 100 can be particularly advantageous in applications or systems where one or more spring damper device(s) is/are at least partially pre-compressed or preloaded, so that the system in which they operate is preloaded, and so that the spring (e.g., 102) can assist to apply a nominal biasing force (e.g., for accounting for adjustments between two structures) and can absorb an impulse shock event (e.g., FIGS. 2C and 3), while the damper 108 acts as a damping device that dampens vibration and/or resonance between two structures or bodies of a system (see the discussion of FIG. 3 regarding a firearm sight mounted to a firearm, where the spring damper devices operate in this manner).

As a viscoelastic polymeric damper, the dampers exemplified herein (e.g., 108, and the other "08" series numbered dampers) can have particularly advantageous properties as a damper situated within an inner diameter region of a directional spring, and being pre-loaded, in one example. The term "viscoelastic" refers to any material that exhibits properties of both liquids (viscous solutions) and solids (elastic materials). Thus, a viscous material deforms under load and transmits forces in all directions, and distributes a small amount of pressure over a large area, but does not recover its shape when a load is removed (i.e., the time at which the load is immediately removed). An elastic material deforms under load and returns to its original shape when that load is removed. However, having both a viscous element and an elastic element, a viscoelastic polymer component can concurrently exhibit desirable characteristics of both a liquid and an elastic material (i.e., deforming under a load and transmitting forces in all directions, and recovering to its original shape when the load is removed). During the initial compression of a viscoelastic polymer damper or element, it deforms somewhat like water, and then behaves more like an elastic material as it reaches its maximum or designed deformation limit.

Viscoelastic polymers (such as those marketed under the registered trademark "Sorbethane" by Sorbethane, Inc.) combine shock absorption, good memory, vibration isolation and vibration damping characteristics. While many materials exhibit one or more of these characteristics, a viscoelastic polymer combines them into a stable material with a long fatigue life and a relatively low creep rate compared to other polymers (rubber, neoprene, silicone, etc.). A viscoelastic polymer has a relatively high damping coefficient over a very wide temperature range as compared to any other polymer, such as from −20° to +160° Fahrenheit. Unlike fluid-based shock absorbers or foam dampers/products, a viscoelastic polymer can absorb shocks efficiently for millions of cycles. Viscoelastic polymers can absorb over 50 percent of vibration energy over most or all of its temperature operating range at frequencies from 10 to 30000 Hz, in some examples, depending upon the configuration of the viscoelastic polymer.

Conversely, as also mentioned above, traditional metal springs and rubber mounts have been used as isolators, but have almost no damping capability. And, traditional fluid dampers have some damping capability, but have relatively no isolation capability. Traditional foam products have been used as isolators, but suffer from limited life and other known disadvantages.

Note that durometer is a measure of hardness used for polymers. A higher durometer is a frequent indicator of a stronger polymeric material. However, viscoelastic polymers are softer than rubber and most other polymers. Viscoelastic polymers can be formed or cast from 30 to 70 durometer on a Shore 00 scale, but can vary below 30 (while sacrificing strength) or above 70 (while limiting viscoelastic properties).

Figure 1A:
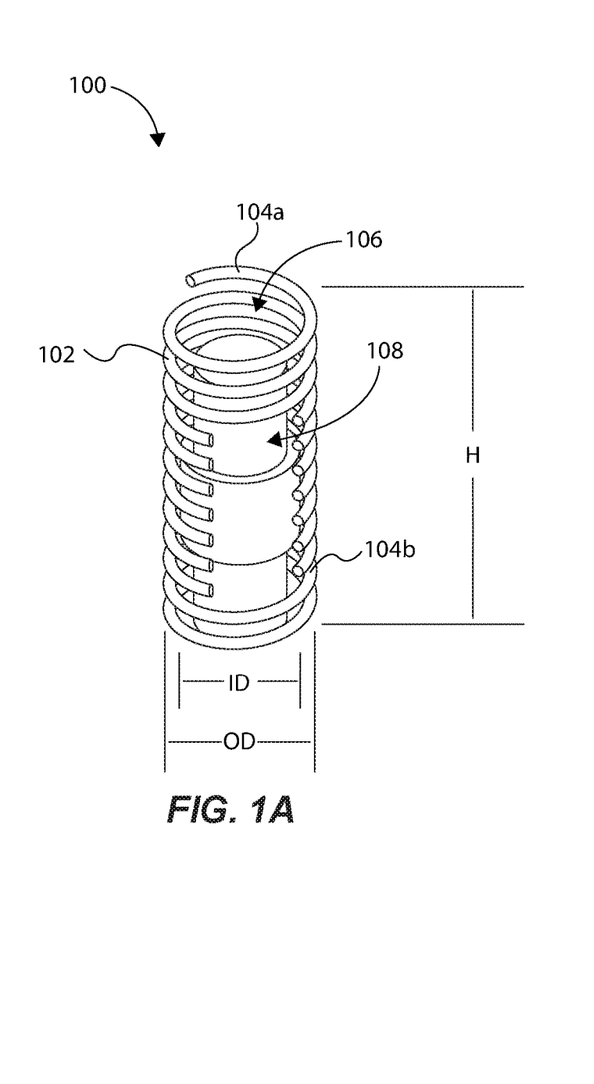
FIG. 1A is an isometric view of a spring damper device, and illustrating a cutout section of a spring to show a damper in the spring, in accordance with an example of the present disclosure.
Figure 1B:
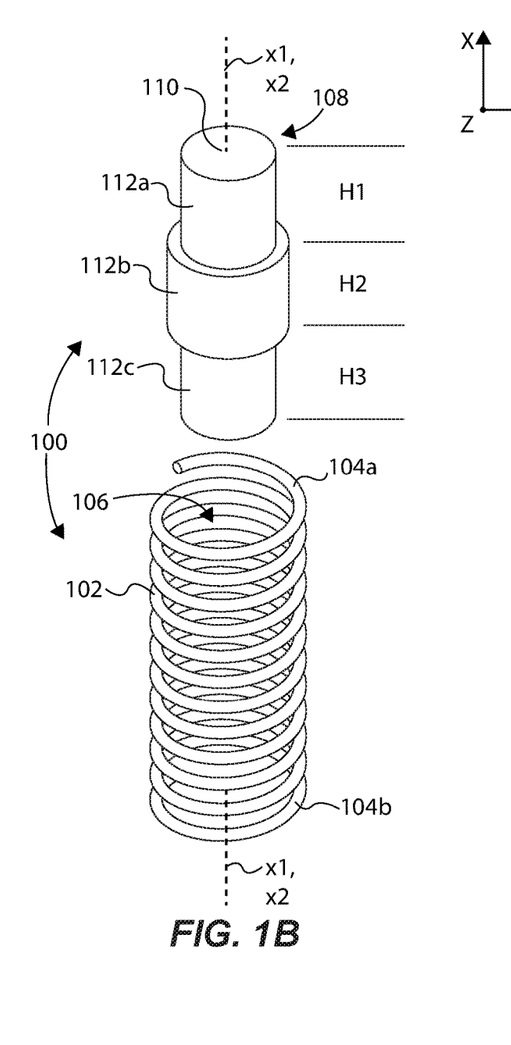
FIG. 1B is an isometric view of the spring damper device of FIG. 1A, and showing the damper exploded from the spring.

With this in mind, and with continued reference to FIGS. 1A and 1B, the spring 102 has an inner diameter ID, an outer diameter OD, and a height H (at free length). In this way, the inner diameter region 106 can be a space or void defined by the inner diameter ID and the height H. Thus, the inner diameter region 106 can generally be a cylindrical, three dimensional shape or void that is bounded vertically between the first and second ends 104a and 104b, and laterally by the distance defined by the inner diameter ID of the spring 102 along any point of the inner circumference of the spring 102. As shown in FIG. 1A, the damper 108 can be entirely situated within the inner diameter region 106. Said another way, there is no portion or material of the damper 108 that extends beyond the inner diameter region 106. And, as further discussed below, during compression and operation of the spring damper device 100, the damper 108 the damper 108 can be configured, such that it does not substantially (or at all) contact the inner surfaces of the spring 102 while being compressed, so that the spring 102 does not impinge or pinch the damper 108, or in other words, so that the damper 108 does not bind the spring 102 during compression and expansion of the spring 102 and the spring damper device 100.

In this example, the damper 108 can be substantially coaxially aligned with the directional spring 102. That is, the damper 108 can have a longitudinal central axis X1 that extends through a center portion 110 of the damper 108, and the spring 102 can have a longitudinal central axis X2 that extends through a centroid or center point of the spring 102 (and consequently through a center point of the inner diameter region 106). As illustrated in FIG. 1B, the longitudinal central axes X1 and X2 are substantially coaxially aligned relative to each other. This provides the advantage of the spring 102 and the damper 108 operating in a uniform and axially aligned manner when compressed, so that any biasing or compression force (and damping characteristics) are substantially centered, and therefore more effective than if off-center. This can be advantageous because, being coaxial, this provides a compact or low profile device for space restricted envelopes (e.g., see FIG. 3). Alternatively, in an example, a particular spring damper device contemplated herein can comprise a center compression spring with an array of visco-elastic dampeners spaced around the compression spring (such that the compression spring is coaxial with a central axis defined by the array of visco-elastic dampeners). In yet another example, a particular spring damper device as contemplated herein can include a singular visco-elastic dampener having an array of compression springs situated around the dampener (such that the visco-elastic dampener is coaxial with a central axis defined by the array of springs). In any of such configurations, the various spring damper devices contemplated herein can be relatively compact or low profile to suit particular design requirements, because they can have a coaxial configuration that consumes or requires less space than traditional configurations for damping and absorbing impact loads.

Further to this concept, the damper 108 can be formed as a slug, meaning that it can be formed from a uniform, single or solid piece or slug of viscoelastic polymeric material. This is advantageous because solid dampers are more resistant to off-axis loading in cases when additional or incidental shock is encountered (e.g., if a device, such as a weapon is dropped or stored unrestrained and transported being exposed to both shock and vibration profiles). Note that in some instances, it may be desirable to have a damper of the present disclosure retained mechanically or chemically with adhesive on one or both end surfaces of the damper, which may provide some level of retention to keep the damper in a desired position.

FIG. 1B shows that the damper 108 can comprise a first section 112a having a first diameter D1, a second or mid-section 112b having a second diameter D2, and a third section 112c having a third diameter D3. As shown, the first and third sections 112a and 112c extend from opposite sides of the second section 112b. In one aspect, the first and third diameters D1 and D3 of the first and third sections 112a, 112c, respectively, can be substantially the same, and can each be less than the second diameter D2 of the second or mid-section 112b. In another aspect, the first and third sections 112a,112c can be different diameters from one another and from the second section 112b, or both. Essentially, the first, second and third sections 112a-c can comprise any diameter desired, and any two or more diameters can be the same or none of them can be the same.

Similarly, in one aspect, the first section 112a and the third section 112c can have substantially the same heights H1 and H3, and can be substantially the same as height H2 of the second section 112b. In another aspect, the first and third sections 112a, 112c, respectively, can comprise different heights from each other, as well as from the second section 112b, or both. Essentially, the first, second and third sections 112a-c can comprise any height desired, and any two or more heights can be the same or none of them can be the same.

In the configuration of FIGS. 1A-2O, the damper 108 is shown as being symmetrical about the xyz axes. This is beneficial because such symmetry accepts a shock load by allowing the energy to be absorbed then dissipated in a more balanced and uniformed reaction. Thus, a symmetrical damper provides a more predictable response derived from the shape of the damper (e.g. a cylindrical shape having a 360° dispersion of energy). Note that a square shape may allow more energy to be released along the surfaces and less at the corners. Notably, the second section 112b, being sized wider or larger in diameter than the adjacent first and third sections 112a and 112c, can assist to properly position the damper 108 within the spring 102, so that it does not shift off-axis too much, or lean or sit in one direction along the y axis (i.e., it helps to center the damper 108 relative to the spring 102, so that it remains substantially coaxial during operation). In this manner, the diameter of the second section 112b can be slightly less than or smaller than the inner diameter ID of the spring 102 (e.g., less than 10 percent smaller).

Figure 2A:
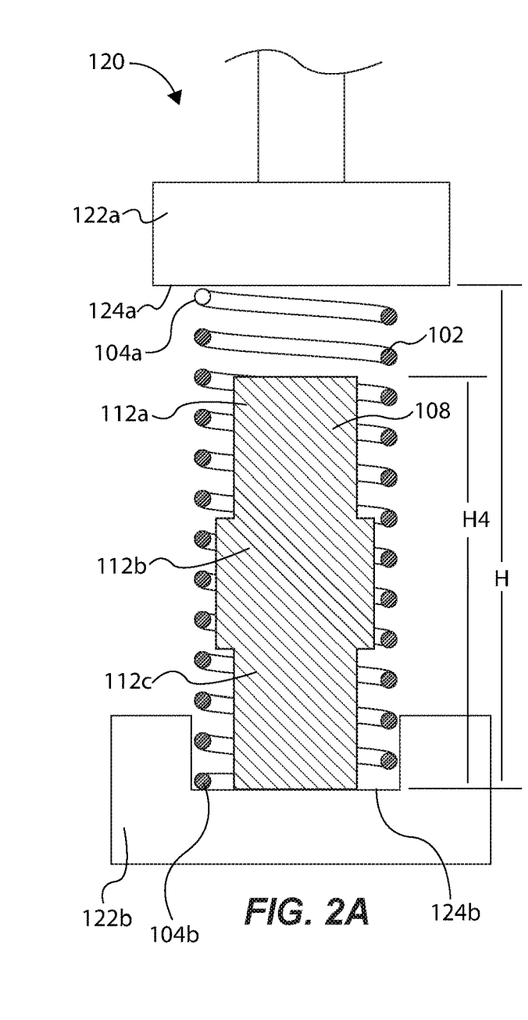
FIG. 2A is a cross sectional view of a system for damping shock, and showing the spring damper device of FIG. 1A taken along lines 2A-2A and in an uncompressed position between first and second structures, in accordance with an example of the present disclosure.
Figure 2B:
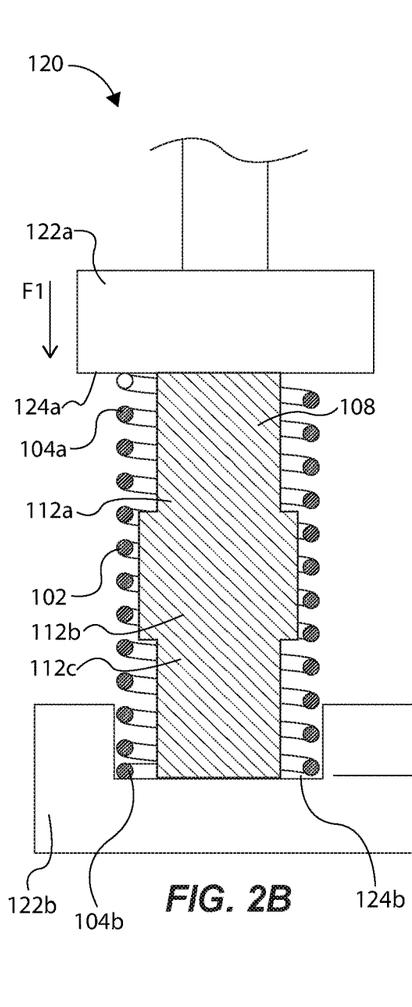
FIG. 2B is a cross sectional view of the system of FIG. 2A, and showing the spring damper device in a partially compressed position.
Figure 2C:
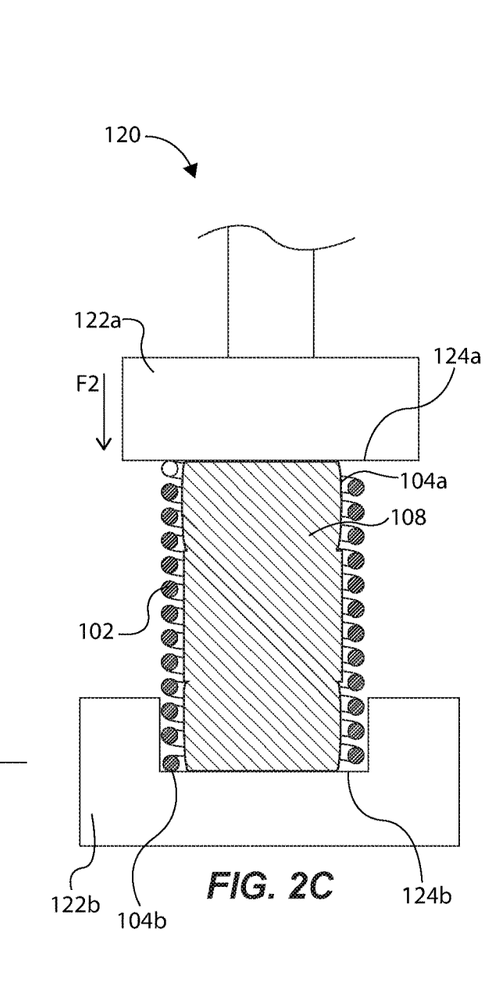
FIG. 2C is a cross sectional view of the system of FIG. 2A, and showing the spring damper device in a partially or fully compressed position.

In one example, FIGS. 2A-2O illustrate a system 120 for absorbing an impact shock event and for damping vibration, the system utilizing the spring damper device 100 (e.g., with spring 102 and damper 108). More particularly, the system 120 can comprise a first structure 122a having a spring seat 124a, and a second structure 122b having a spring seat 124b. The second structure 122b can be positioned opposite the first structure 122a, and the first structure 122a can be operable to move toward (and away from) the second structure 122b, whether axially or radially, such as during a shock event.

The spring seat 124a can comprise a planar surface as shown, that supports or interfaces with the first end 104a of the spring 102, while the spring seat 124b can comprise a bore or recess that supports or interfaces with the second end 104b of the spring 102. In FIG. 2A, the spring 102 is shown in its free length position, meaning that little or no compression force is applied to the spring 102. Similarly, the damper 108 is in an uncompressed position or state in FIG. 2A, and is resting against the second structure 122b due to gravity, for instance, if the spring damper device 100 is situated generally vertically relative to earth.

Note that the spring 102 comprises the first height H when uncompressed or at its free length, and the damper 108 comprises a second height H4 when uncompressed or at its free length. As shown, the first height H is greater than the second height H4, such that the damper 108 is contained within a working range of the directional spring 102. In one example, as illustrated, the second height H4 is greater than half the height H of the spring 102 when in the free length. However, varying heights of the damper are contemplated herein, depending on the particular design requirements.

As illustrated in FIG. 2B, a load or force F1 is being applied to the spring damper device 100 from the first structure 122a (but can be from the second structure 122b, or both), which load or force F1 partially compresses the spring 102 between the first and second structures 122a and 122b. In the position shown, the first structure 122a is further in contact with and is partially compressing the damper 108 (the damper 108 already being seated against the second structure 122b). In this position, where the spring damper device 100 is compressed to a certain degree (e.g., approximately 50 percent compression), the damper 108 is somewhat smashed and expanded as compared to its initial uncompressed state as shown in FIG. 2A. Being a viscoelastic polymer, and being configured as shown, the first and third sections 112a and 112c of the damper 108 expand radially outwardly to a greater degree or rate than that of the second section 112b. This is also because the first and third sections 112a and 112c are initially contacted or compressed by respective first and second structures 122a and 122b, so they transfer mechanical energy to thermal energy prior to that of the second section 122b. As noted above, because a viscoelastic polymer initially acts more like a fluid, the first and third sections 112a and 112c expand and deform somewhat like a fluid during the initial compression of the damper 108, so that the second section 122b is limited in outward radial expansion because of the geometry and viscoelastic characteristics of the first and third sections 122a and 122c.

Figure 3:
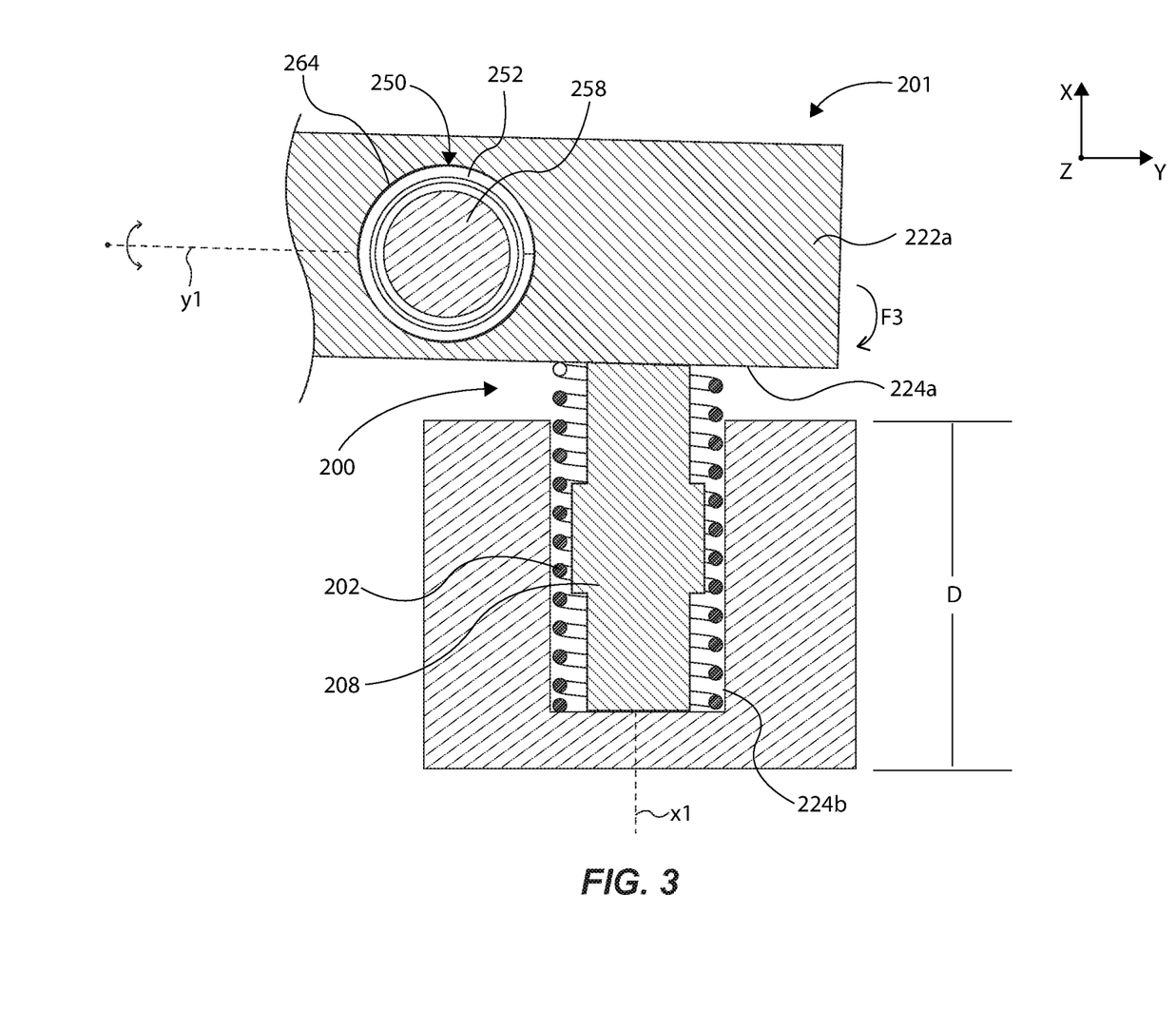
FIG. 3 is a cross sectional view of a system for damping shock, and showing the (first) spring damper device of FIG. 1A and in a preloaded or partially compressed position between first and second structures, and another (second) spring damper device in a preloaded or compressed position situated orthogonally or transverse relative to the first spring damper device, in accordance with an example of the present disclosure.

In the partially compressed position of FIG. 2B (but not fully compressed), the system 120 can remain generally static, such as in a pre-loaded system (see e.g., FIG. 3). From this configuration or state, as illustrated in FIG. 2C, the system 120 can benefit from absorbing an impulse shock event from the first structure 122a via the spring 102 (because the spring 102 and the damper 108 can further compress to the position in FIG. 2C), and can concurrently benefit from attenuating vibration and/or resonance via the damper 108, because the damper 108 is more fully compressed between the first and second structures 122a and 122b from its state as shown in FIG. 2B, and as a viscoelastic polymer, it can absorb or attenuate vibration to a relatively high degree (as compared to other materials, such as rubber, foam, etc.). Prior devices, like fluid dampers, or foam or rubber "crash pads", are fundamentally designed as a secondary spring, and not as a damper to attenuate the high frequencies of vibrations and resonance. Thus, prior dampers can negatively affect the spring rate of a primary (coil) spring at the end of travel of the primary spring, which consequently affects the system as a whole. In the present disclosure, a substantial amount of vibrational energy (and/or resonate energy) is prevented from reaching the second structure 122b, because the pre-compressed damper 108 converts it to thermal energy for dissipation therefrom, without affecting the spring rate of the spring 102, as further discussed herein.

Notably, because the damper 108 can be a viscoelastic polymer damper, the profile of the damper 108 can transition from having a non-uniform outer surface and non-uniform cross-sectional area along its longitudinal center axis x1 (FIG. 2B) to a generally uniform outer surface and uniform cross-sectional area along its longitudinal center axis x1 when compressed to or near its maximum compression limit, as shown in FIG. 2C. In this transition, the second section 112b does not expand outwardly to any appreciable degree, unlike the first and third sections 112a and 112c, which expand outwardly a greater degree as the damper 108 is compressed near or at its maximum compression limit. Because of this, the damper 108 can be configured such that it does not contact or interface with the inner surface of the coil of the spring 102, which results in the damper 108 not binding the spring 102, thereby not substantially affecting the spring rate of the spring 102. Compare this to traditional "dual spring" systems discussed above, where an inner coil spring (or other spring element) is situated within an outer, larger coil spring. When the larger coil spring reaches a certain position when compressed by a shock event, the second smaller spring is then compressed, and thereby acts as a backup or secondary spring that affects or changes the spring rate of the larger coil spring and the system. In the present disclosure, the damper 108 acts as a damper to dampen or attenuate vibration and/or resonance, and to not substantially affect operation or the spring rate of the spring 102 that acts to absorb an impact shock independent of the operation of the damper 108. Therefore, during operation, the damper 108 does not substantially change or affect or impede the spring rate of the spring 102, because the damper 108 is formed of a viscoelastic polymer, and tailored (shaped and sized) so that, when compressed, it does not contact or interface with the spring 102 to bind or slow or stop movement of spring (or if the damper 108 does contact the spring 102, such contact is incidental and does not, or is ineffective to, change or modify the spring rate of the spring 102). Indeed, the damper 108 can be sized and configured so that upon maximum compression of the spring 102, the damper 108, while also compressed, does not push beyond the boundary defined by the inner diameter of the spring 102 into the spaces between the coils of the spring 102 where they might be contacted (e.g., pinched) by compressing coils of the spring 102.

Advantageously, the spring 102 can act, at least partially, as its own structural support for the spring damper device 100. Specifically, because the second end 104a of the spring 102 is situated in and against the spring seat 124b being a bore, sides of the spring 102 can be supported by the sidewall of the bore to prevent the spring damper device 100 from sliding or falling out of the spring seat 124b. This avoids the inclusion of support components that are typically required in many traditional spring systems, such as vehicle spring systems and others that require a number of brackets, fasteners, clamps, etc. to hold or seat a spring in-place.

In systems where the value of the impulse shock event is known or predictable (such as with a firearm where the shock load from firing a known type and caliber of projectile is known and repetitive), the spring damper device 100 can be designed in a particular manner to optimize shock absorbed by the spring 102, and vibration attenuated or damped by the damper 108. In such examples where the shock load is known or predictable, the variables for designing a particular directional spring (e.g., 102) can include the spring constant, the material, the free length, the inner diameter, the coil diameter, etc. The variables for designing a particular damper (e.g., 108) can include the durometer, the shape; the size; the type of viscoelastic polymer, the height relative to the spring free length, diameter(s), and others as will be recognized. In this example, the directional spring can be designed so that it does not "bottom out" from the known or predicted shock impulse event; while the damper can be designed to not "bottom out" from the maximum predicted shock load, and to not "bind up" the spring when compressed and uncompressed within its predicted working range. Note that there may exist some slight or inconsequential contact between the spring and the damper during operation of the spring damper device; however, such contact can be designed to be minimal, such that it does not significantly or consequentially bind the spring or otherwise directly or negatively affect compression and expansion of the spring.

FIG. 3 illustrates one such example of a system 201 where a spring damper device 200 (similar or the same as the spring damper device 100 discussed above) is preloaded or pre-compressed between a first structure 222a and a second structure 222b, such that the first and second structures are under a preload, or are in a preloaded state. By "preloaded" this means that the spring damper device 200 is in a default or nominal position or state where it is at least partially compressed between first and second structures, such that a directional spring 202 and a damper 208 are both compressed to some degree due to a load between the first and second structures (i.e., the first and second structures are in a preloaded state or condition). In one non-limiting example, the first structure 222a can be a structural component of a projectile firing mechanism, such as a sight mount of a firearm, and the second structure 222b can be part of a sight device or assembly mounted to the firearm via the sight mount. Types of sight devices can include, but are not limited to optical/optics sights (e.g., a telescopic sight, commonly referred to as a scope, a reflector sight, a collimator sight, a holographic sight, a laser sight), as well as other types of sights, such as a thermal weapon sight, a night vision sight, and others. For convenience of discussion, an optics type of sight will be discussed in more detail, although such is merely intended to be exemplary. In the example of an optical/optics sight device or assembly mounted to a firearm, it is desirable to absorb shock when firing a projectile (i.e., a shock impulse event), so that the optical sight assembly is not damaged or affected due to the shock event that occurs at firing, but at the same time it is also desirable to dampen vibrations and/or resonance so that the sensitive optical sight assembly does not resonate and/or vibrate for an undesirable duration of time after firing (or from resonate frequencies due to electrical devices, human interaction, or other external forces that cause resonance). Thus, as a preloaded spring damper device 200, when a user makes positional adjustments of the first structure 222a relative to the second structure 222b, such as adjusting xyz axial and/or rotational position(s) of the optical sight relative to the firearm, the spring 202 can account for and accommodate such positional adjustments, whether in compression or expansion along the x axis, which accounts for the relative distance and relative movement between the first and second structures 222a and 222b (sometimes referred to as "play") while being adjusted in position relative to each other. Making adjustments to the relative position of the first and second structures 222a, 222b can also function to vary the preload. Note that the system may be designed so that the maximum adjustment range of the spring 202 may be limited, such that the damper 208 is prevented from becoming separated (i.e., out of contact) from the first structure 222a, which could defeat the purpose of damping vibration between the first and second structures 222a and 222b. Further note that the first structure 222a may operate to rotate about the y axis relative to the second structure 222b, as illustrated by the rotational arrows around axis y1, such as is the case when making micro adjustments of the optical sight relative to the firearm.

Accordingly, in response to an anticipated shock impulse event or load F3 from the first structure 222a to the second structure 222b, the spring 202 will compress and the damper 208 will compress a certain degree (see e.g., FIG. 20). Because the load F3 is known or predictable, and because the spring damper device 200 is predesigned to absorb the known or predictable load and attenuate vibrations corresponding to such load, the spring 202 will compress a known or predictable distance (but not "bottom out"), and the damper 208 will also compress a known or predicable amount by deforming while transferring mechanical energy to thermal energy to dampen or attenuate vibration and/or resonance between the first and second structures 222a and 222b.

In one example, a spring seat 224a of the first structure 222a can comprise a planar surface as shown. In another example, the spring seat 224a can comprise or be configured as a counter bore (similar to spring seat 224b) having any desired or needed depth. In one example, the spring seat 224b of the second structure 222b can comprise or be configured as a counterbore that has a depth D. In one example, the counter bore depth can be at least 50 percent a free length or height of the spring 202 (see e.g., height H of spring 102). However, this relationship may vary to achieve counter bore depths that are more or less than this depending on the particular design of the system. For example, a shallower counter bore having a depth that is less than 50 percent of the length of the spring may be acceptable (see e.g., FIG. 2A). As discussed above, seating the spring 202 and damper 208 in a counter bore allows the spring damper device 200 to act as its own support structure, so that additional fastening or mounting components are not needed or required to retain the position of the spring 202 and damper 208 during operation. The counter bore limits lateral movement of the spring damper device 200. This may be particularly advantageous where available space in a system is limited, and where the spring may only be a few millimeters in free length, such as may be the case with a micro adjustment system of a sight device mounted to a firearm.

In one example, a plurality of spring damper devices may be incorporated into a particular system to absorb shock and attenuate vibration along different axes. For example, as is illustrated in FIG. 3, the system 201 comprises a second or supplemental spring damper device 250 shown situated in or against the first structure 222a (in a cross sectional view of the first structure 222a and the spring damper device 250), Here, the second supplemental spring damper device 250 can be situated or oriented along a different axis (e.g., the central axis of the second spring damper device 250 being oriented along the Z axis) than that of the first spring damper device 200 (the central axis of the first spring damper device 200 being oriented along the X axis), In this manner, the second spring damping device 250 can be said to be oriented transverse or generally orthogonal relative to the spring damper device 200 (i.e., the central axes of each spring damper device 200 and 250 can extend along different axes that are transverse or orthogonal relative to each other).

The second or supplemental spring damper device 250 may be seated between the first and second structures 222a and 222b similarly as the spring damper device 200, as shown. Accordingly, the spring damper device 250 can also include a directional spring 252 (coil) and a damper 258 (viscoelastic polymer damper) situated within an inner diameter region of the spring 252 (similar as spring damper devices 100 and 200). Thus, the spring damper device 250 may be situated in a counterbore or spring seat 264 of the first structure 222a (with the other end of the spring 252 being seated against a spring seat (out of view) of the second structure 222b, or another structure). Although not shown as it is out of view, the second structure 222b may be a complex three dimensional support structure, wherein a portion of the second structure 222b extends near or adjacent the spring damper device 250, which portion comprises a spring seat for seating the spring 252.

With this system setup, the first structure 222a (e.g., the firearm sight) somewhat "floats" relative to the second structure 222b (e.g., the firearm sight mount), so that when the user makes micro adjustments of the position of the sight, one or more of the springs of the damper devices 200, 250 expand and/or compress to account for movement resulting from such micro adjustments (which may or may not vary the preload). This can also account for or remove any backlash or "play" or undesirable wiggle/movement between the first and second structures 222a and 222b. As mentioned above, preloaded springs in prior systems (i.e., without incorporating a damper like damper 208) can be effective at removing such backlash or play in an adjustment mechanisms, but often such prior systems suffer from creating an "underdamped" system, which is problematic with high/impulse shock systems like a projectile firing system because resonate vibrations transfer to the optical device, for instance, which can cause damage to the optical device, thereby affecting performance and proper use of the optical device.

In a further example, more than two spring damper devices (e.g., 250, 252) can be incorporated into the system 201 (or an other system), such as between 3 and six spring damper devices, where each of the plurality of spring damper devices are preloaded, as described above. In one example, wherein the system comprises six spring damper devices, three of the six spring damper devices can be situated generally parallel to each other and oriented along an x axis (i.e., situated like spring damper device 200), and distributed about particular areas between the first and second structures 222a and 222b in a preloaded configuration. The remaining three of the six spring damper devices can be situated parallel to each other and oriented along a z axis (i.e., parallel to the spring damper device 250), and distributed about particular areas between the first and second structures 222a and 222b in a preloaded configuration. Each of the plurality of spring damper devices (six in this case) can be designed to function with each of the other spring damper devices and the corresponding structures that support them to achieve the desired performance.

In one example, the spring (e.g., springs 102,202) (and others exemplified herein) can be made or configured on a micro scale, such as having an outer spring diameter from 2 mm to 10 mm (but this micro range can vary, and other micro diameters are contemplated). Thus, in one example where the outer spring diameter of the spring 202 in the system 201 of FIG. 3 is approximately 3 mm, the diameter of the counterbore of the spring seat 224b can be slightly larger, such as 3.05 mm or greater, so that the spring 202 is retained in and by the counterbore (i.e., the sidewall of the counterbore would be immediately adjacent the outer surfaces of the spring, so that the spring does not substantially move laterally, or rotationally). The ratio of the diameter of the counter bore to the outer spring diameter in this case is 3.05:3 or 1.02. The counter bore for the spring 252 can be similarly sized and configured using a similar ratio. No matter the size of the spring of a spring damper system as taught herein, whether on a micro or other scale, the cross-sectional area (e.g., diameter) of the counter bore of the spring seat of the structure designed to receive and retain the spring can be configured to be larger than the outer diameter of the spring in accordance with any desired and operable ratio. In some examples, the ratio between the counter bore diameter and the outer spring diameter can be between 1.01 and 1.05 depending upon the system in which the spring damper is intended for use. However, this is not intended to be limiting in any way. Providing spring damper devices on a micro or miniature scale can further mean that such devices can have in outer diameter on the order of 2.5 mm to 5 mm, for instance (or even less than 2.5 mm).

It is contemplated that the spring damper devices taught herein can be used in a number of different types of systems in addition to the projectile firing system or mechanism (e.g., firearm) discussed herein. Indeed, some example systems in which the spring damper devices as taught herein can be utilized include, but are not limited to, any suitable commercial or military sighting system for hand held firearms, armored fighting vehicles, and vision systems for monitoring industrial applications in harsh environments or in product validation test applications.

Figure 4:
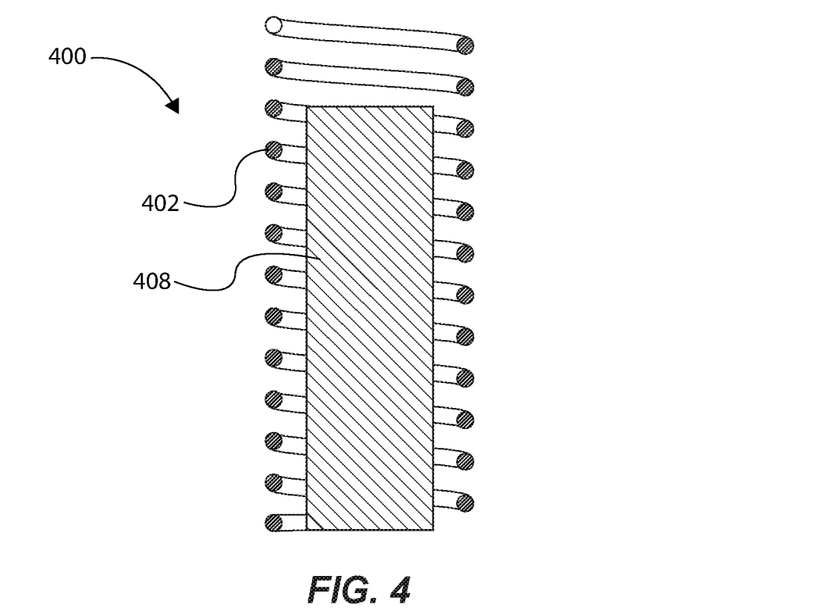
FIG. 4 is a cross sectional view of a spring damper device in an uncompressed position, in accordance with an example of the present disclosure.

FIG. 4 illustrates a spring damper device 400 in accordance with an example of the present disclosure. The spring damper device 400 is shown in an uncompressed position, and can be incorporated in the systems described herein, or in any other system. In this example, a damper 408, situated within a spring 402, can comprise a cylindrical shaped, uniform slug comprised of a viscoelastic polymer material. The spring damper device 400 can be designed similarly as described above, and can have the same or similar advantages and benefits of the other spring damper devices discussed herein.

Figure 5:
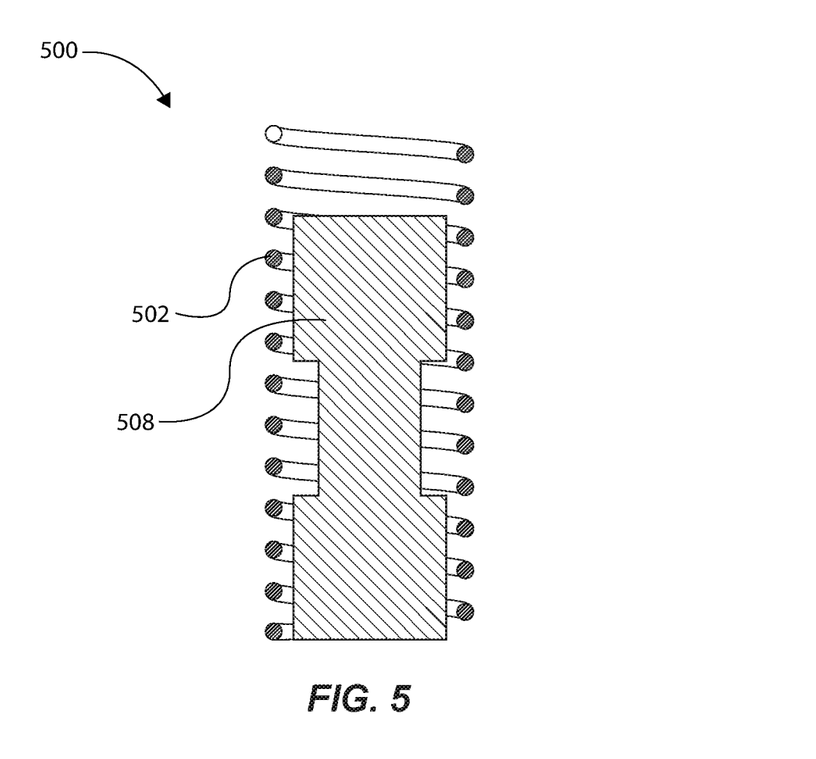
FIG. 5 is a cross sectional view of a spring damper device in an uncompressed position, in accordance with an example of the present disclosure.

FIG. 5 illustrates a spring damper device 500 in accordance with an example of the present disclosure. The spring damper device 500 is shown in an uncompressed position, and can be incorporated in the systems described herein, or in any other system. In this example, a damper 508, situated within a spring 502, can comprise a non-uniform shaped slug comprised of a viscoelastic polymer material. The damper 508 comprises an "I-shaped" 2D cross sectional profile, as shown, which is somewhat an inverse profile of the damper 108 of FIG. 2A. The spring damper device 500 can be designed similarly as described above, and can have the same or similar advantages and benefits of the other spring damper devices discussed herein.

Figure 6:
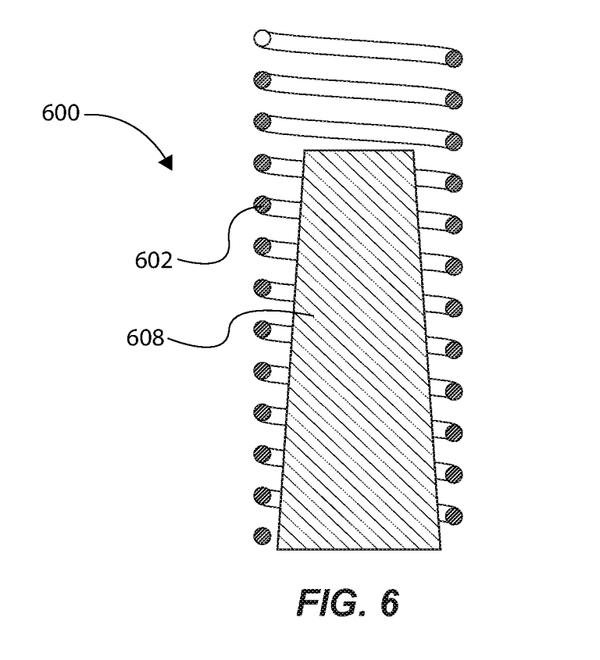
FIG. 6 is a cross sectional view of a spring damper device in an uncompressed position, in accordance with an example of the present disclosure.

FIG. 6 illustrates a spring damper device 600 in accordance with an example of the present disclosure. The spring damper device 600 is shown in an uncompressed position, and can be incorporated in the systems described herein, or in any other system. In this example, a damper 608, situated within a spring 602, can comprise a frustoconical shaped slug comprised of viscoelastic polymer material, and having a trapezoidal 2D cross sectional profile (in another arrangement, the slug can be inverted so that the thicker section is above the smaller section). The spring damper device 600 can be designed similarly as described above, and can have the same or similar advantages and benefits of the other spring damper devices discussed herein.

Figure 7:
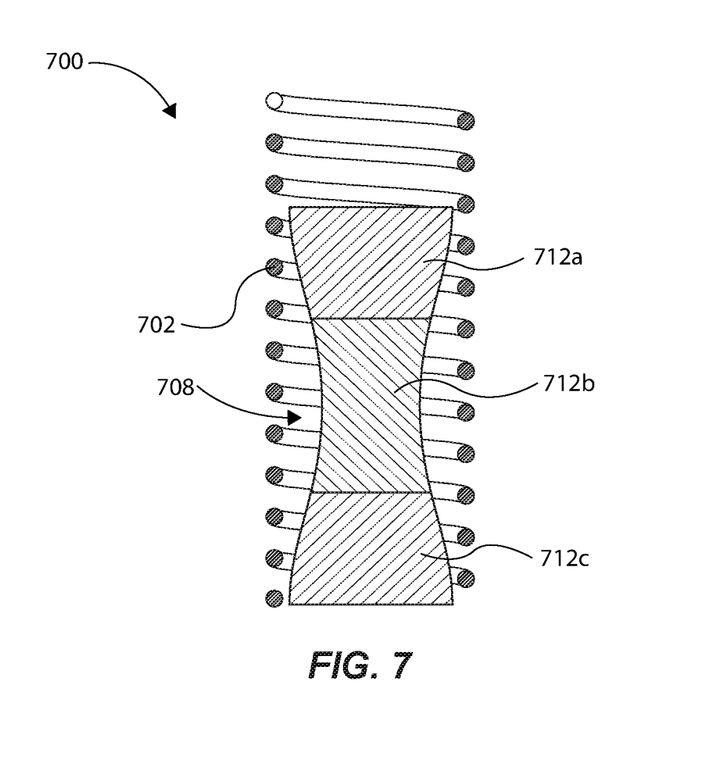
FIG. 7 is a cross sectional view of a spring damper device in an uncompressed position, in accordance with an example of the present disclosure.

FIG. 7 illustrates a spring damper device 700 in accordance with an example of the present disclosure. The spring damper device 700 is shown in an uncompressed position, and can be incorporated in the systems described herein, or in any other system. In this example, a damper 708, situated within a spring 702, can comprise a curvilinear shaped slug comprised of a plurality of viscoelastic polymer materials, and having a curved 2D cross-sectional profile. The damper 708 can include a plurality of sections 712a-c situated adjacent one another (in this view stacked on each other), with at least two of the sections (or all three of the sections) comprising a different type of viscoelastic polymer material (e.g., having different durometers). This can provide some level of varying damping effects as vibrations transfer through the sections 712a-c as the spring 702 compresses during the travel of the spring 702. The spring damper device 700 can be designed similarly as described above, and can have the same or similar advantages and benefits of the other spring damper devices discussed herein.

Figure 8:
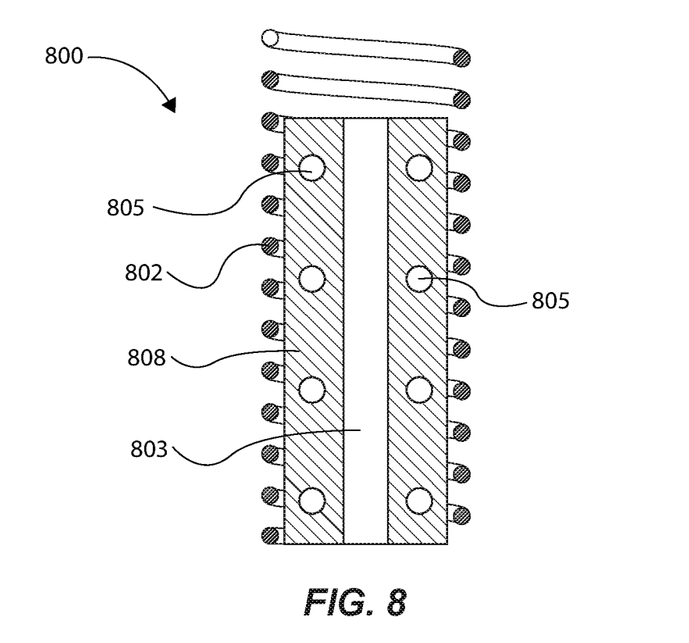
FIG. 8 is a cross sectional view of a spring damper device in an uncompressed position, in accordance with an example of the present disclosure.

FIG. 8 illustrates a spring damper device 800 in accordance with an example of the present disclosure. The spring damper device 800 is shown in an uncompressed position, and can be incorporated in the systems described herein, or in any other system. In this example, a damper 808, situated within a spring 802, can comprise a cylindrically shaped slug comprised of viscoelastic polymer material, and can further comprise a central aperture 803 that extends through the damper 808 along a longitudinal central axis of the damper 808. In another aspect, a plurality of cavities 805 (or slots or openings) can be formed through or into the damper 808, thus providing the damper 808 with finer tuning capabilities, wherein the damper 808 can be secondarily tuned to achieve desired performance capabilities (the primary tuning being the combined initial selection of the size, type and configuration of the spring 802 and the damper 808 for an intended use). In addition to the tuning principles mentioned above, the voids or cavities 805 may be used as deformation zones in designs requiring extended axial range or slug length, or both. Thus, more material may be displaced internally about the damper while material does not expand outwardly (e.g., the diameter of the damper will not increase noticeably), which is particularly true in cases where the damper has a hollow core to allow for internal flow, as in FIG. 8. The spring damper device 800 can be designed similarly as described above, and can have the same or similar advantages and benefits of the other spring damper devices discussed herein.

Figure 9:
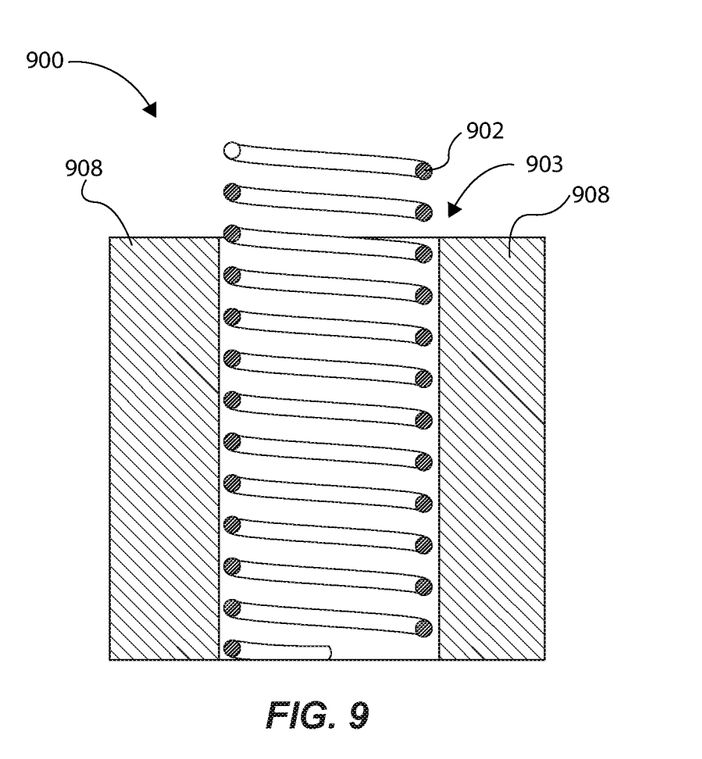
FIG. 9 is a cross sectional view of a spring damper device in an uncompressed position, in accordance with an example of the present disclosure.

FIG. 9 illustrates a spring damper device 900 in accordance with an example of the present disclosure. The spring damper device 900 is shown in an uncompressed position, and can be incorporated in the systems described herein, or in any other system. In this example, a spring 902 is situated within an aperture or bore 903 of a damper 908. The damper 908 can comprise cross-sectional profile or area of any shape or configuration. Furthermore, the damper can have the bore 903 formed through the damper, extending from a first end to a second end, thus forming first and second openings in respective ends or end surfaces of the damper 908. In the specific example shown, the damper 908 comprises a slug having a cylindrical or disk shaped cross-sectional area. The damper 908 can further be comprised of viscoelastic polymer material. The bore 903 of the damper 908 can comprise a size (e.g., a diameter) sufficient to receive, and at least partially support, the spring 902, such that the spring 902 is contained within the bore 903. The spring 902 can comprise a length or height that is greater than that of the damper 908, such that the spring 902 extends beyond the damper 908 in at least one direction. In this case, a first end of the spring 902 extends beyond a first end of the damper 908, with a second end of the spring 902 being positioned about a same plane as the second end of the damper 908, similar to other examples discussed herein. In this configuration, the spring damper device 900 can be situated between first and second structures, and can be contained within a spring seat in each of the first and second structures, one or both of which can be configured as a counter bore, also similar to other example spring damper devices (e.g., spring damper device 100) as discussed herein. Note that the spring 902 and the damper 908 are substantially coaxial in this example. This configuration provides benefits in applications that may require springs having a particular inner diameter (and consequently spring constant), and in applications where a larger damping effect may be needed. This may further be beneficial in applications that require a component to extend through the spring 902, such as a rod. In other applications, freeing-up the inner diameter area of the spring 902 in this manner may be beneficial in applications where an optical path may need to pass through the inner diameter area of the spring without obstruction. Note that the configuration of the damper 908 of FIG. 9 may be beneficial in a larger system where a dampening zone is required in an area so that a number of spring damper devices may be required, but instead, several springs can be installed in the bore 903 of the damper 908. The spring damper device 900 can be designed similarly as described above, and can have the same or similar advantages and benefits of the other spring damper devices discussed herein. Note that the damper 908 may be situated within a counter bore, similar but inversely as shown in FIG. 3.

Figure 10:
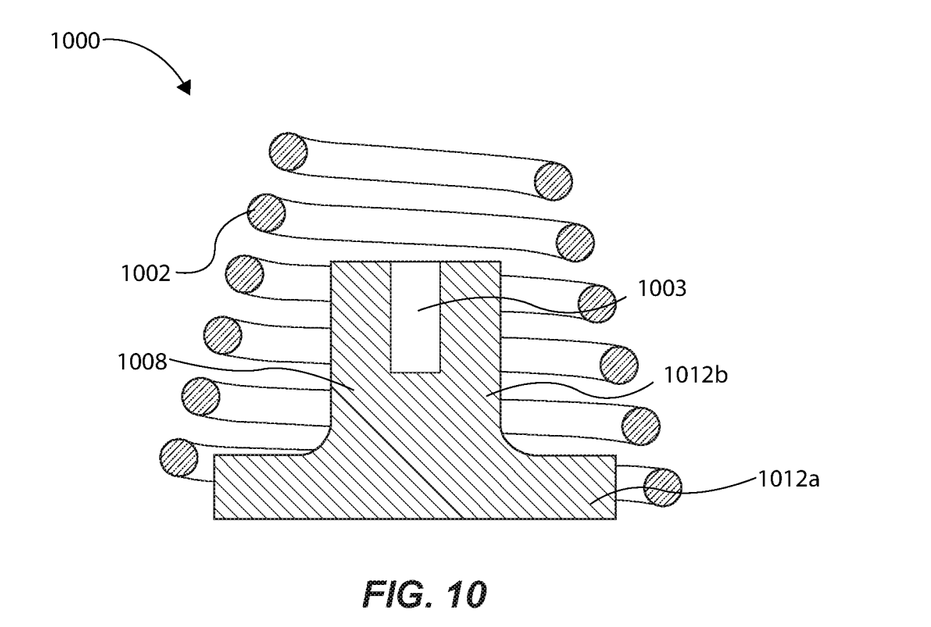
FIG. 10 is a cross sectional view of a spring damper device in an uncompressed position, in accordance with an example of the present disclosure.

FIG. 10 illustrates a spring damper device 1000 in accordance with an example of the present disclosure. The spring damper device 1000 is shown in an uncompressed position, and can be incorporated in the systems described herein, or in any other system. In this example, a directional spring 1002 can be a conical shaped coil spring, and a damper 1008, situated within the spring 1002, can be an irregular shaped slug comprised of viscoelastic polymer material. The damper 1008 can have a first section 1012*a* and a second section 1012*b*, where the second section 1012*b* has a smaller diameter than the first section 1012*a* and extends upwardly from the first section 1012*a*. In this shape, the damper 1008 will not interfere with operation of the spring 1002 (i.e., the damper 1008 will not contact the spring 1002 during compression). Thus, the damper 1008 will not interfere with the spring 1002 when compressed. Note that the second section 1012*b* of the damper 1008 has a height that is substantially equivalent to the solid height of the spring 1002 (i.e., the unusable travel of the spring 1002 in compression). Further note that an outer diameter of the second section 1012*b* should be less than the inner diameter of the uppermost coil of the spring 1002, so that the damper 1008 does not contact and interfere with the operation of the spring 1002. The damper 1008 can further comprise a blind hole 1003 (i.e., a bore or partial bore) formed axially at least part way through a center of the second section 1012*b*, which can facilitate inner deformation of the damper 1008. The spring damper device 1000 can be designed similarly as described above, and can have the same or similar advantages and benefits of the other spring damper devices discussed herein. Note that the spring 1002 and the damper 1008 are coaxially situated with each other.

Figure 11:
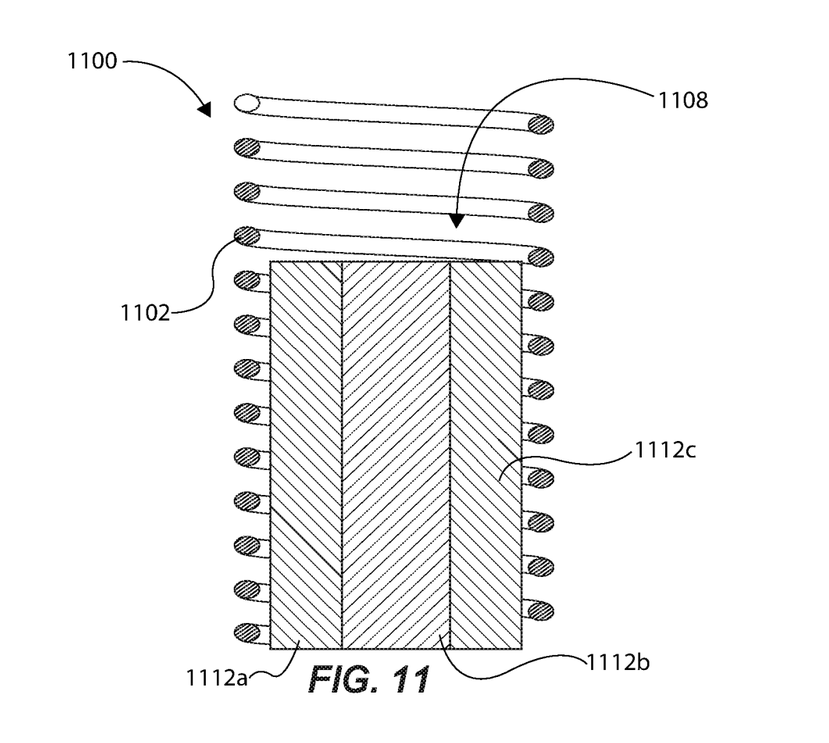
FIG. 11 is a cross sectional view of a spring damper device in an uncompressed position, in accordance with an example of the present disclosure.

FIG. 11 illustrates a spring damper device 1100 in accordance with an example of the present disclosure. The spring damper device 1100 is shown in an uncompressed position, and can be incorporated in the systems described herein, or in any other system. In this example, a damper 1108, situated within a spring 1102, can comprise a cylindrically shaped body comprised of a plurality of sections 1112*a-c* that can be comprised of the same or different viscoelastic polymer materials. The sections 1112*a-c* can be loosely interfaced to and in contact with each other, such as via friction. The configuration of FIG. 11 can be beneficial by providing increased general or localized structure by marrying or coupling two or more materials with different durometers. Having different materials in the damper provides additional options for variable dampening through the working range of the device. In another example, the sections 1112*a-c* can be oriented 90 degrees from the orientation shown in FIG. 11, so that they are layered horizontally (relative to the view shown). The spring damper device 1100 can be designed similarly as described above, and can have the same or similar advantages and benefits of the other spring damper devices discussed herein. Note that the spring 1102 and the damper 1108 are coaxially situated with each other.

It should be appreciated by those skilled in the art that the different features of the various dampers describe herein can be combined to generate a number of different damper configurations, such as the shape, size, number of sections, apertures, cavities, profiles, durometers, etc.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A spring damper device, comprising:
a single directional spring having first and second ends, and defining an inner diameter region; and
a viscoelastic damper comprising a viscoelastic polymer comprising both an element of viscosity and an element of elasticity, and configured to extend from the first end to the second end of the single directional spring and to be situated within the inner diameter region of the single directional spring, the viscoelastic polymer comprising an absorption property where over 50 percent of vibration energy is absorbed at frequencies from 10 to 30,000 Hz, the viscoelastic damper further comprising a first section having a first diameter, a second section having a second diameter, and a third section having a third diameter, wherein the first and third diameters are substantially the same and are each less than the second diameter,
wherein, in response to a load on the spring damper device, the single directional spring operates to compress to absorb the load and any impact shock associated with the load, and the viscoelastic damper operates to dampen vibration associated with the load,
wherein the viscoelastic damper is sized and configured such that, upon a maximum compression of the single directional spring, the viscoelastic damper is maintained within the inner diameter region of the single directional spring so as to not interfere with the operation of the single directional spring,
wherein an entirety of the viscoelastic damper is situated between the first and second ends of the single directional spring, and
wherein, during compression of the spring and the viscoelastic damper, the viscoelastic damper operates independently of the spring, such that the spring rate of the single directional spring is substantially unaffected by the viscoelastic damper.

2. The spring damper device of claim 1, wherein the viscoelastic damper is coaxially aligned with the single directional spring.

3. The spring damper device of claim 1, wherein the first and third sections are each formed on opposing sides of the second section.

4. The spring damper device of claim 1, wherein the first and third sections have an uncompressed profile when the viscoelastic damper is in an uncompressed state, and where the first and third sections have an compressed profile when the viscoelastic damper is in a compressed state, the compressed profile being substantially the same as a profile of the second section in the uncompressed and compressed states.

5. The spring damper device of claim 1, wherein the single directional spring comprises a coil spring and the inner diameter region is defined by an inner diameter of the coil spring, and wherein the viscoelastic damper is sized to be entirely situated within the inner diameter region of the coil spring.

6. The spring damper device of claim 1, wherein the viscoelastic damper comprises a non-uniform outer surface and cross-sectional area along a longitudinal axis when in an uncompressed state, and a substantially uniform outer surface and cross-sectional area along the longitudinal axis when in a compressed state.

7. The spring damper device of claim 1, wherein the single directional spring comprises a height when uncompressed, and wherein the viscoelastic damper comprises a height when uncompressed, wherein the height of the spring is greater than the height of the viscoelastic damper, such that the viscoelastic damper is contained with a working range of the single directional spring.

8. The spring damper device of claim 1, wherein the viscoelastic damper is substantially coaxially aligned with the single directional spring.

9. A system for absorbing shock and damping vibration, comprising:
a first structure having a spring seat;
a second structure having a spring seat, the second structure being positioned opposite the first structure;
at least one spring damper device situated between the first and second structures, the at least one spring damper device comprising:
a single directional spring having a first end positioned against the spring seat of the first structure, and a second end positioned against the spring seat of the second structure, the single directional spring defining an inner diameter region; and
a viscoelastic damper situated within the inner diameter region of the single directional spring, and comprising a viscoelastic polymer comprising both an element of viscosity and an element of elasticity, the viscoelastic polymer comprising an absorption property where over 50 percent of vibration energy is absorbed at frequencies from 10 to 30,000 Hz, the viscoelastic damper further comprising a first section having a first diameter, a second section having a second diameter, and a third section having a third diameter, wherein the first and third diameters are substantially the same and are each less than the second diameter,
wherein, in response to a load on the single directional spring from the second structure, the single directional spring operates to compress to absorb the load and an impact shock associated with the load, and the viscoelastic damper operates to dampen at least one of shock or vibration associated with the load,
wherein the viscoelastic damper is sized and configured such that, upon a maximum compression of the single directional spring, the viscoelastic damper is maintained within the inner diameter region of the single directional spring so as to not interfere with the operation of the single directional spring, and
wherein an entirety of the viscoelastic damper is situated between the first and second ends of the single directional spring, and
wherein, during compression of the spring and the viscoelastic damper, the viscoelastic damper operates independently of the spring, such that the spring rate of the single directional spring is substantially unaffected by the viscoelastic damper.

10. The system of claim 9, wherein the single directional spring and the viscoelastic damper are at least partially compressed to comprise a pre-load between the first and second structures, such that the single directional spring operates to absorb an impulse shock event while the viscoelastic damper operates to attenuate vibration.

11. The system of claim 9, wherein the spring seat of the first structure comprises a bore sized and shaped corresponding to the single directional spring, wherein the first end of the single directional spring and at least part of the viscoelastic damper are received and situated within the bore, such that the single directional spring and the bore cooperatively operate as structural support for the single directional spring.

12. The system of claim 9, further comprising a plurality of spring damper devices situated between the first and second structures, each of the plurality of spring damper devices comprising a single directional spring and a viscoelastic damper situated within the single directional spring, respectively, to define a plurality of spring damper devices, wherein the plurality of spring damper devices are at least partially compressed to comprise a pre-load between the first and second structures.

13. The system of claim 12, wherein the first structure comprises a sight mount of a projectile firing mechanism, and wherein the second structure comprises a sight device mounted to the projectile firing mechanism via the sight mount, the plurality of single directional springs operable to account for positional adjustments of the sight device relative to the projectile firing mechanism, and the plurality of viscoelastic dampers operable to attenuate vibration to the sight device in response to a firing event.

14. The system of claim 12, wherein at least one spring damper device is situated transverse relative to at least one other spring damper device.

15. The system of claim 12, wherein each respective single directional spring is seated in a bore of the second structure, such that each bore and respective single directional spring cooperate to operate as structural support for the single directional spring.

16. A method for making a spring damper device, comprising:
 providing a single directional spring having first and second ends, and defining an inner diameter region; and
 providing a viscoelastic damper comprising a viscoelastic polymer comprising both an element of viscosity and an element of elasticity, the viscoelastic polymer comprising an absorption property where over 50 percent of vibration energy is absorbed at frequencies from 10 to 30,000 Hz, the viscoelastic damper being configured to extend from the first end to the second end of the single directional spring and be situated within the inner diameter region of the single directional spring, the viscoelastic damper comprising a first section having a first diameter, a second section having a second diameter, and a third section having a third diameter, wherein the first and third diameters are substantially the same and are each less than the second diameter, such that the first and third sections are formed on opposing sides of the second section,
 wherein, in response to a load on the spring damper device, the single directional spring operates to compress to absorb the load and an impact shock associated with the load, and the viscoelastic damper operates to dampen at least one of shock or vibration associated with the load,
 wherein the viscoelastic damper is sized and configured such that, upon a maximum compression of the single directional spring, the viscoelastic damper is maintained within the inner diameter region of the single directional spring so as to not interfere with the operation of the single directional spring, and
 wherein an entirety of the viscoelastic damper is situated between the first and second ends of the single directional spring, and
 wherein, during compression of the spring and the viscoelastic damper, the viscoelastic damper operates independently of the spring, such that the spring rate of the single directional spring is substantially unaffected by the viscoelastic damper.

17. The method of claim 16, wherein the entirety of the viscoelastic damper is sized and shaped to fit within an inner region of the single directional spring.

18. A method for assembling a spring damper system, comprising:
 providing a first structure having a plurality of spring seats, and a second structure having a plurality of spring seats, wherein the second structure is movable relative to the first structure;
 situating a plurality of spring damper devices against respective spring seats of the first structure, wherein each spring damper device comprises a single directional spring and a viscoelastic damper situated within an inner diameter region of the single directional spring, the viscoelastic damper comprising a first section having a first diameter, a second section having a second diameter, a third section having a third diameter, wherein the first and third diameters are substantially the same and are each less than the second diameter, such that the first and third sections are formed on opposing sides of the second section, and a viscoelastic polymer comprising both an element of viscosity and an element of elasticity, and the viscoelastic polymer comprising an absorption property where over 50 percent of vibration energy is absorbed at frequencies from 10 to 30,000 Hz, wherein the viscoelastic damper is sized and configured such that, upon a maximum compression of the single directional spring, the viscoelastic damper is maintained within the inner diameter region of the single directional spring so as to not interfere with the operation of the single directional spring, and wherein an entirety of the viscoelastic damper is situated between the first and second ends of the single directional spring;
 positioning the second structure adjacent the first structure, such that the plurality of spring damper devices are biased against respective spring seats of the second structure and in a pre-loaded state, wherein each directional spring operates to attenuate an impulse shock between the first and second structures, and wherein each viscoelastic damper operates to dampen vibration between the first and second structures.

19. The method of claim 18, further comprising adjusting a position of the second structure relative to the first structure, such that at least one of the single directional springs accounts for the adjusted position by exerting a biasing force associated with the pre-loaded state of the spring damper device.

20. The method of claim 18, wherein situating the plurality of spring damper devices further comprises situating at least two of the spring damper devices to be oriented substantially orthogonal to each other.

21. The method of claim 18, wherein the first structure comprises a plurality of bores that define the spring seats of the first structure, wherein situating the plurality of spring damper devices against the spring seats of the first structure further comprises situating the single directional springs into respective bores, such that each bore and the respective single directional spring cooperate to act as a spring support structure for the respective spring damper device.

22. A spring damper device, comprising:
a single directional spring having first and second ends, and defining an inner diameter region; and
a viscoelastic damper comprising a viscoelastic polymer comprising both an element of viscosity and an element of elasticity, and configured to extend from the first end to the second end of the single directional spring and to be situated within the inner diameter region of the single directional spring, the viscoelastic polymer comprising an absorption property where over 50 percent of vibration energy is absorbed at frequencies from 10 to 30,000 Hz,
wherein, in response to a load on the spring damper device, the single directional spring operates to compress to absorb the load and any impact shock associated with the load, and the viscoelastic damper operates to dampen vibration associated with the load,
wherein the viscoelastic damper is sized and configured such that, upon a maximum compression of the single directional spring, the viscoelastic damper is maintained within the inner diameter region of the single directional spring so as to not interfere with the operation of the single directional spring,
wherein the viscoelastic damper comprises a first section having a first diameter, a second section having a second diameter, and a third section having a third diameter, wherein the first and third diameters are substantially the same and are each less than the second diameter, and
wherein the first and third sections have an uncompressed profile when the viscoelastic damper is in an uncompressed state, and where the first and third sections have an compressed profile when the viscoelastic damper is in a compressed state, the compressed profile being substantially the same as a profile of the second section in the uncompressed and compressed states.

23. A spring damper device, comprising:
a single directional spring having first and second ends, and defining an inner diameter region; and
a viscoelastic damper comprising a first section having a first diameter, a second section having a second diameter, a third section having a third diameter, wherein the first and third diameters are substantially the same and are each less than the second diameter, such that the first and third sections are formed on opposing sides of the second section, and a viscoelastic polymer comprising both an element of viscosity and an element of elasticity, and configured to extend from the first end to the second end of the single directional spring and to be situated within the inner diameter region of the single directional spring, the viscoelastic polymer comprising an absorption property where over 50 percent of vibration energy is absorbed at frequencies from 10 to 30,000 Hz,
wherein, in response to a load on the spring damper device, the single directional spring operates to compress to absorb the load and any impact shock associated with the load, and the viscoelastic damper operates to dampen vibration associated with the load,
wherein the viscoelastic damper is sized and configured such that, upon a maximum compression of the single directional spring, the viscoelastic damper is maintained within the inner diameter region of the single directional spring so as to not interfere with the operation of the single directional spring, and
wherein the single directional spring comprises a height when uncompressed, and wherein the viscoelastic damper comprises a height when uncompressed, wherein the height of the spring is greater than the height of the viscoelastic damper, such that the viscoelastic damper is contained with a working range of the single directional spring, and
wherein, during compression of the spring and the viscoelastic damper, the viscoelastic damper operates independently of the spring, such that the spring rate of the single directional spring is substantially unaffected by the viscoelastic damper.

24. A spring damper device, comprising:
a single directional spring having first and second ends, and defining an inner diameter region; and
a viscoelastic damper comprising a viscoelastic polymer comprising both an element of viscosity and an element of elasticity, and configured to extend from the first end to the second end of the single directional spring and to be situated within the inner diameter region of the single directional spring, the viscoelastic polymer comprising an absorption property where over 50 percent of vibration energy is absorbed at frequencies from 10 to 30,000 Hz,
wherein, in response to a load on the spring damper device, the single directional spring operates to compress to absorb the load and any impact shock associated with the load, and the viscoelastic damper operates to dampen vibration associated with the load,
wherein the viscoelastic damper is sized and configured such that, upon a maximum compression of the single directional spring, the viscoelastic damper is maintained within the inner diameter region of the single directional spring so as to not interfere with the operation of the single directional spring,
wherein an entirety of the viscoelastic damper is situated between the first and second ends of the single directional spring,
wherein, during compression of the spring and the viscoelastic damper, the viscoelastic damper operates independently of the spring, such that the spring rate of the single directional spring is substantially unaffected by the viscoelastic damper, and
wherein the viscoelastic damper comprises a non-uniform outer surface and cross-sectional area along a longitudinal axis when in an uncompressed state, and a substantially uniform outer surface and cross-sectional area along the longitudinal axis when in a compressed state.

* * * * *